United States Patent
Park et al.

[11] Patent Number: 5,917,679
[45] Date of Patent: Jun. 29, 1999

[54] PSEUDO CONTACT TYPE NEGATIVE PRESSURE AIR BEARING SLIDER

[75] Inventors: Ki-Ook Park; In-Eung Kim; In-Seop Jeong, all of Seoul; Tae-Seok Park, Suwon, all of Rep. of Korea

[73] Assignee: Samsung Electronics Co., Ltd., Suwon, Rep. of Korea

[21] Appl. No.: 08/915,342

[22] Filed: Aug. 22, 1997

[51] Int. Cl.$^6$ .................................................. G11B 5/60
[52] U.S. Cl. ............................................................ 360/103
[58] Field of Search .............................................. 360/103

[56] References Cited

U.S. PATENT DOCUMENTS

| | | | |
|---|---|---|---|
| 5,200,868 | 4/1993 | Chapin et al. | 360/103 |
| 5,353,180 | 10/1994 | Murray | 360/103 |
| 5,490,025 | 2/1996 | Dorius et al. | 360/103 |
| 5,568,981 | 10/1996 | Nepela et al. | 360/103 |
| 5,654,853 | 8/1997 | Hagen | 360/103 |
| 5,726,830 | 3/1998 | Koishi et al. | 360/103 |

*Primary Examiner*—Robert S. Tupper
*Attorney, Agent, or Firm*—Jones, Volentine, Steinberg & Whitt, L.L.P.

[57] ABSTRACT

A negative pressure air bearing slider includes a slider body for flying above a surface of a recording disc during relative rotation of the recording disc. First and second projections extend from a lead portion of a principal surface of the slider body to define first and second air bearing surfaces, respectively, the first and second air bearing surfaces being spaced apart from each other in the lateral direction of said slider body. A third U-shaped projection extends from the principal surface and includes a curved front wall portion at least partially located between the first and second projections and first and second side wall portions extending from opposite ends of the curved front wall portion to a rear portion of the principal surface so as to define a rounded negative pressure cavity therein. A fourth projection extends from the rear portion of the principal surface of the slider body at a position centrally located in the lateral direction of the slider body, and a transducer is mounted on a rear edge of the third projection so as to establish pseudo contact with the disc surface while the slider body is flying above the disc surface.

20 Claims, 12 Drawing Sheets

PSEUDO CONTACT TYPE NEGATIVE PRESSURE AIR BEARING SLIDER

BACKGROUND OF THE INVENTION

1. Field of the Invention

The present invention relates to a magnetic disk drive device, and in particular, to a pseudo contact type negative pressure air bearing slider for a transducer head assembly of a magnetic disk drive device.

2. Description of the Related Art

Transducer head assemblies have been designed to literally fly over a rapidly rotating disc, and include an air bearing slider for carrying a magnetic transducer proximate a rapidly rotating disc. The transducer, in the case of pseudo contact type sliders, is generally a thin-film head.

Computer disk drive technology evolution has focused on improvements in "areal density", or the number of bits of information that can be stored in a given space on a magnetic disk. Over the last decade, the majority of progress has been gained through miniaturization of the recording heads and improving the magnetic efficiency of the write/read elements in the heads, and similar improvements in the magnetic and physical properties of the disks.

As suggested above, disk drives contain a plurality of recording heads that "fly" over rotating disks. The magnetic recording efficiency is a function of many physical characteristics of the heads and disks, the most significant of which is the spacing between the rotating disk surface and the recording head "pole" elements. The most straightforward method for manufacturers to improve areal density has been to reduce the spacing between the head and disk, without sacrificing the long term reliability of the disk drive.

Across the previous disk drive industry product offerings, head-disk spacing had steadily decreased from several micro-inches to less than two micro-inches, until there came a point that further increases in areal density required the head to essentially touch the disk during flying. A new class of so-called "pseudo-contact" heads were developed in which the rear portion of the head, where the transducer poles are located, is in constant contact with the disk surface. Various design characteristics were developed to minimize friction and wear between the disk and head, and such "pseudo-contact" designs have proven to be as reliable over the long-term as the non-contact designs.

In magnetic disk technologies, it is generally desired to achieve higher data recording densities without a substantial change in form factor. In the context of the air bearing slider, increased recording densities are obtainable by maintaining the flying height, pitch angle and roll angle constant over the whole disk surface, to thereby enhance floating stability and contact start stop (CSS) reliability. In the case of the pseudo contact type slider, the "flying height" of the slider in effect refers to the pressure (or lack of pressure) applied to the disk surface by the assembly, and in particular, by the thin film transducer. Ideally, the slider should fly at a height in which the transducer makes pseudo contact with the disk surface at minimum pressure.

On the one hand, the magnetic head must fly at a sufficient height to avoid frictionally related problems caused by excessive physical contact during data communication between the magnetic head and the rapidly rotating disk. On the other hand, the head should be made to fly as low as possible to obtain the highest possible recording densities. As the magnetic head is fixed to the slider mechanism, the disk recording density increases as the flying height of the slider decreases. Accordingly, it is preferred that the slider fly as close as possible to the disk surface. A constant flying height is preferably maintained, regardless of variations in tangential velocity during flying, cross movements of the slider during data search operations, and changes in skew angle in the case of rotary type actuators.

To achieve stable flying characteristics, the slider should also fly at a pitch angle that falls within a safe range of a predetermined value. The pitch angle is defined as the tilt angle between the principal plane of the slider in the tangential direction of the rotating disc and the principal plane of the disc surface. The pitch angle is positive in the normal case in which the flying height of the rear portion of the slider is lower than that of the front portion of the slider. A transducer is generally situated at the lowest position of the rear portion of the slider for maximizing recording data capacity. If the designed pitch angle is too small, the possibility exists that a disturbance will cause the front end of the slider dip down such that a negative pitch ensues resulting in a collision with the rapidly rotating disk. On the other hand, if the designed pitch angle is too large, the air stiffness needed for stable flying can be disadvantagously reduced. Therefore, to maintain stability while avoiding the situation of a negative pitch angle, the slider should be configured such that the pitch angle can be controlled to fall within an optimum value range. Another factor to consider regarding pitch angle is the general tendency for the pitch angle to increase with skew angle increases as the slider is positioned in a radially outward direction over the disc surface. Thus, the pitch angle should fall within the safe range regardless of skew angle variations.

Differing hydrodynamic forces support the inner and outer air bearing surface (ABS) rails of the slider, and resulting variations in side leakage air flow with skew angle changes can generate roll angle variations. Here, the inner and outer rails refer to those ABS rails of the slider positioned toward the inner periphery and outer periphery of the disc, respectively. Also, roll angle is defined as the tilt angle between the principal plane of the slider in the radial direction of the disc and the principal plane of the disc surface. As the transducer is usually centrally located on the rear slider edge in the case of psuedo contact slider, optimum performance is obtained by avoiding roll angle over the entire disk surface area.

Figure 1:
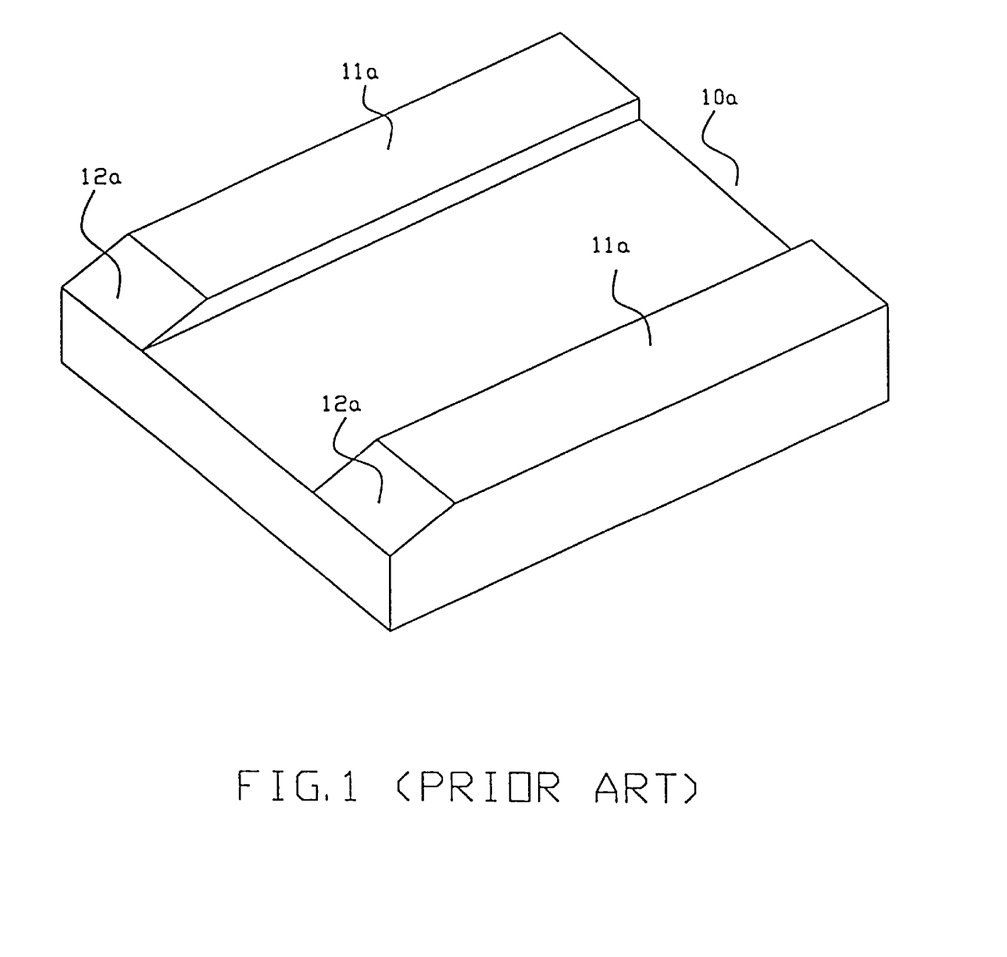
FIG. 1 is a perspective view illustrating a conventional slider having tapered and flat air bearing surfaces.

FIG. 1 is a schematic perspective view of a conventional tapered flat slider. In FIG. 1, two rails 11a are formed in parallel at a predetermined height on a surface of a slim hexahedron body 10a to thus form lengthwise extending ABS's. A tapered or sloped portion 12a is formed at each leading edge portion of the ABS rails 11a. In such a structure, air within a very thin boundary layer rotates together with the rotation of the disk due to surface friction. When passing between the rotating disk and the slider, the air is compressed by the ramp 12a on the leading edge of the ABS 11a. This pressure creates a hydrodynamic lifting force at the ramp section which is sustained through the trailing edge of the ABS, thus allowing the slider to fly without contacting the disk surface.

The conventional slider of this type suffers a drawback in that the flying height, pitch angle and roll angle vary considerably according to the skew angle of the rotary type actuator, i.e., according to the radial position of the slider over the disc surface. For flying heights of 3.0 millionths of an inch and greater, minor height and tilt fluctuations in the slider do not generally affect the read/write operations of the disk. However, current-day standards require flying heights below 2.0 millionths of an inch. At such small flying heights, even minor variations in flying height, pitch angle and roll angle can severely affect the reliability of the head read/write function of a hard disk drive.

Figure 2:
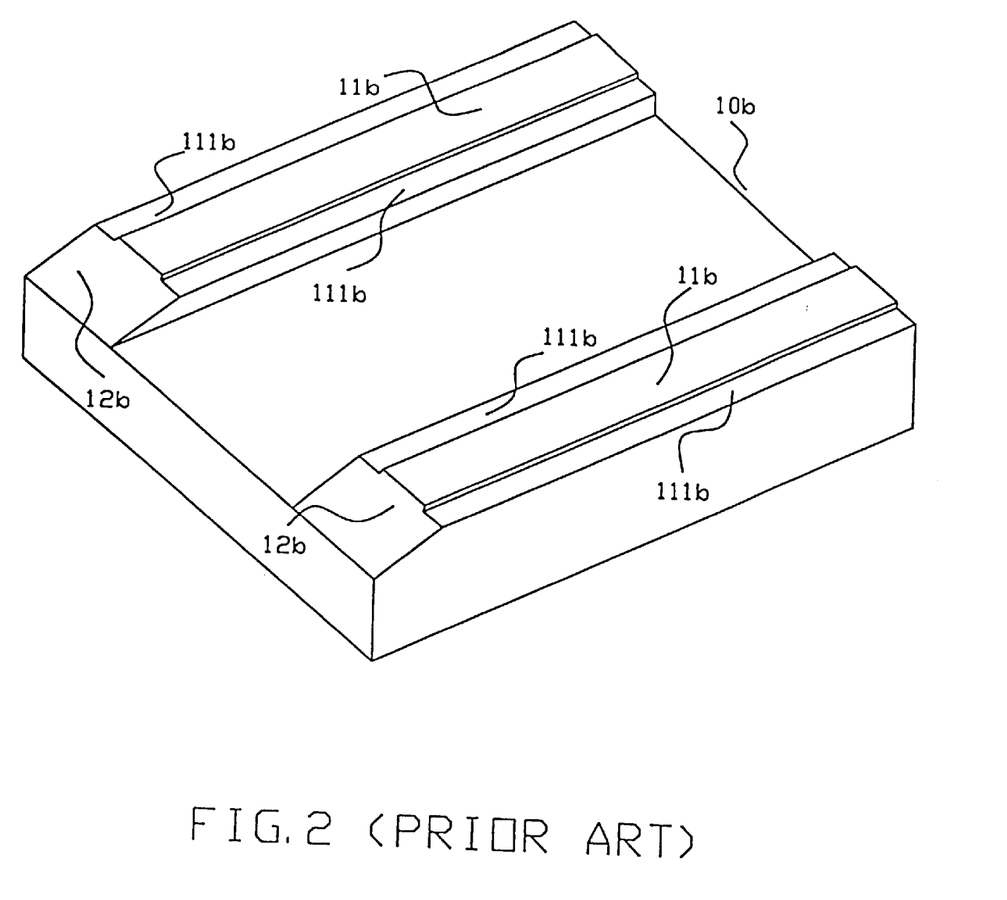
FIG. 2 is a perspective view illustrating a conventional slider having a transverse pressure contour (TPC) configuration.

An improved configuration aimed at countering flying height variations over the entire disc surface is the transverse pressure contour (TPC) slider, as described, for example, in U.S. Pat. No. 4,673,996. As shown in FIG. 2 herein, this slider is also characterized by ABS rails 11b formed on a slider body 10b, and ramp portions 12b formed at the leading edge of the ABS rails 11b. In addition, however, a step-down 111b is formed lengthwise on the both sides of each of the ABS rails 11b. The slider of this TPC structure has the advantage of maintaining reasonably constant flying height regardless of skew angle variations. However, this TPC slider exhibits reduce flying stability which is caused by insufficient air stiffness resulting in the reduction of the ABS surface area. Also, the TPC modification does not improve pitch and roll angle variations resulting from changes in skew angle.

Figure 3:
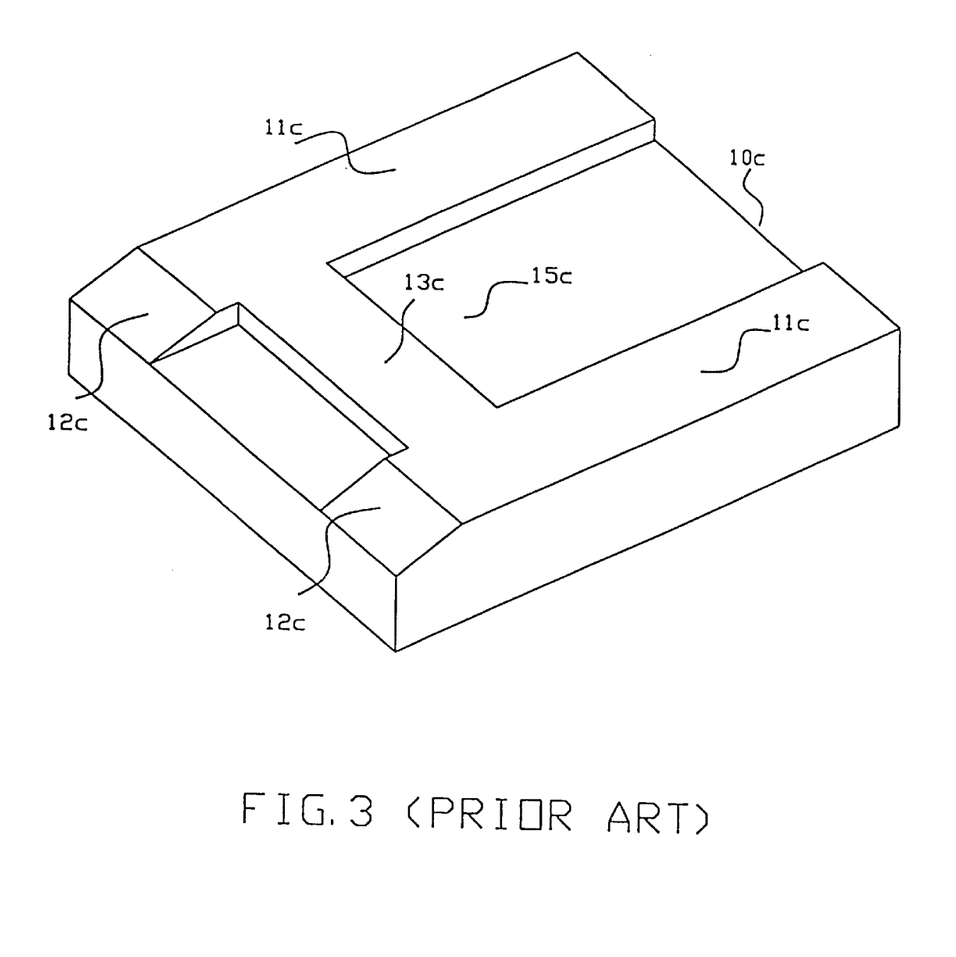
FIG. 3 is a perspective view illustrating a conventional slider having a negative pressure air bearing (NPAB) configuration.

In light of the above, to better realize a constant flying height and constant pitch and roll angles and to obtain an improve contact start stop (CSS) performance, most current air bearing sliders have adopted a negative pressure air bearing (NPAB) type of configuration with a variety of air bearing surface shape changes. A basic NPAB slider has the same structure of the slider shown in FIG. 1, together with a cross rail connecting the ABS rails. That is, as shown in FIG. 3, two ABS rails 11c each having a slope 12c at a leading edge thereof are formed in parallel on a surface of a body 10c. A cross rail 13c having the same height as the ABS rail 11c is formed between the rails 11c proximate the slopes 12c. The cross rail 13c creates a negative pressure cavity 14c in proximity to the central surface portion of the body 10c. Thus, since the pressure of the air passing over the cross rail is diffused as it passes the negative pressure cavity 14c, a pulling or suction force is downwardly applied on the slider which reduces suspension gram load and provides the advantage of a fast take off from the disc surface. The counter action between the positive and negative forces reduces the sensitivity of the slider flying height relative to disc velocity and increases the slider stiffness characteristics.

Because of sub-ambient pressure of cavity 14c, roll angle during a high skew condition can worsen, meaning that the NPAB slider of FIG. 3 exhibits more negative roll effects at high skew positions than the convention tapered flat slider of FIG. 1. Also, there is a tendency for debris to gather at the cross-rail 13c. Such debris can ultimately have an adverse effect on performance.

SUMMARY OF THE INVENTION

In consideration of the above, it is an object of the present invention to provide a negative pressure air bearing slider for a hard disk drive in which the application of negative pressure is stable, and the accumulation of debris is minimized.

It is another object of the present invention to provide a negative pressure air bearing slider for a hard disk drive which can maintain a relatively constant flying height regardless of skew angle.

It is still another object of the present invention to provide a negative pressure air bearing slider for a hard disk drive in which roll angle variations are minimized, sufficient air stiffness is maintained, and a constant optimum pitch angle is held.

Accordingly, to achieve the above and other objects, there is provided according to the invention a negative pressure air bearing slider, comprising: a slider body for flying above a surface of a recording disc during relative rotation of the recording disc, the slider body having a principal surface for confronting the disc surface, said principal surface having a lead portion, a rear portion, a first side portion and a second side portion, wherein the lead portion is spaced upstream of the rear portion relative to a longitudinal direction of said slider body which is coincident with a tangential rotational direction of the recording disc, and wherein the first side portion is spaced from the second side portion relative to a lateral direction of said slider body; first and second projections extending from said lead portion of said principal surface of said main body to define first and second air bearing surfaces, respectively, wherein said first and second air bearing surfaces are spaced apart from each other in the lateral direction of said slider body; and a third U-shaped projection extending from said principal surface and having a curved front wall portion at least partially located between said first and second projections and first and second side wall portions extending from opposite ends of said curved front wall portion to said rear portion of said principal surface so as to define a rounded negative pressure cavity therein, said curved front wall portion and said first and second curved side wall portions being spaced apart from said first and second projections, wherein the first and second curved side wall portions respectively extend along said first and second side portions of said principal surface and define third and fourth air bearing surfaces located at said rear portion of said principal surface and space apart from each other relative to the radial direction of said slider body; a fourth projection extending from said rear portion of said principal surface of said slider body at a position centrally located in the lateral direction of said slider body; and a transducer mounted on a rear edge of said third projection so as to establish pseudo contact with the disc surface while said slider body is flying above said disc surface.

BRIEF DESCRIPTION OF THE DRAWINGS

The above objects and advantages of the present invention will become more apparent from the detailed description of the preferred embodiments thereof with reference to the attached drawings, in which.

DETAILED DESCRIPTION OF THE PREFERRED EMBODIMENTS

Figure 4:
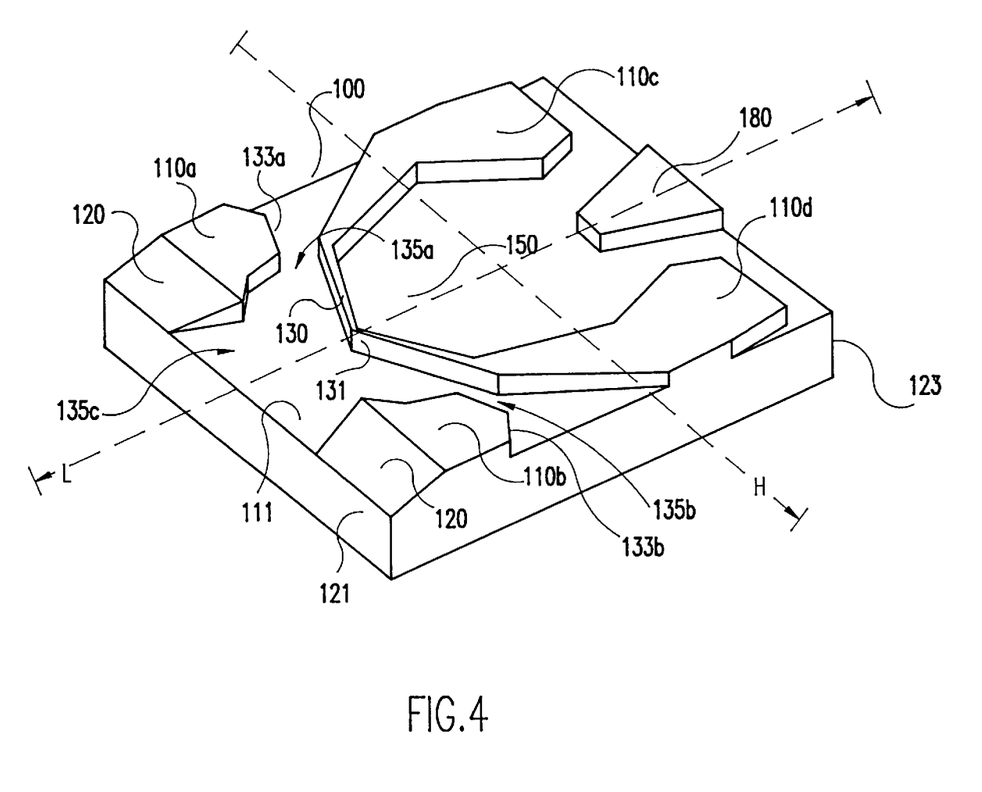
FIG. 4 is a perspective view illustrating an embodiment of a negative pressure slider for a hard disk drive according to the present invention.
Figure 5:
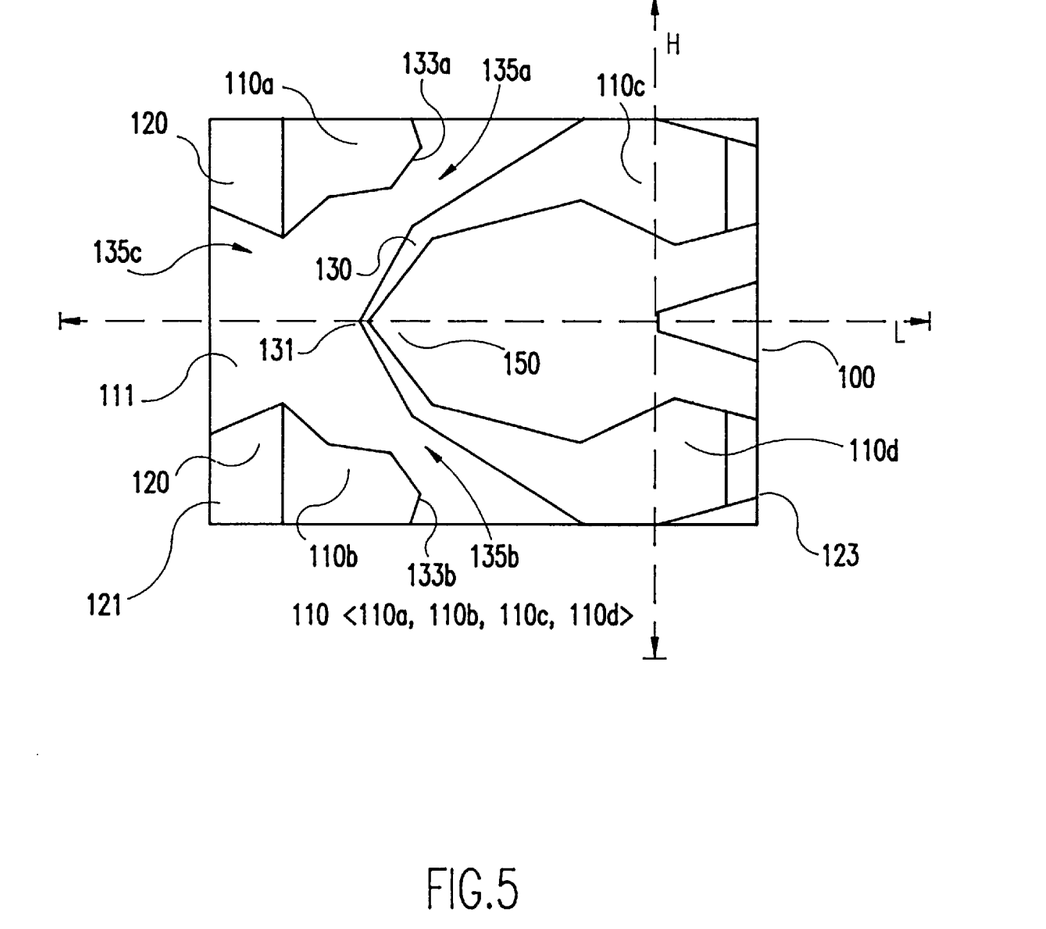
FIG. 5 is a plan view illustrating an embodiment of a negative pressure slider for a hard disk drive according to the present invention.

FIGS. 4 and 5 respectively illustrate a perspective view and a plan view of one embodiment of a negative pressure slider for a hard disk driver according to the present invention.

As shown in FIGS. 4 and 5, first and second lead ABS platforms 110a and 110b are provided at a lead surface portion of a slider body 100 projecting from a principal surface 111 thereof. The lead ABS platforms 110a and 110b are symmetrically or unsymmetrically disposed on opposite sides of a longitudinal axis L of the slider body 100 and are aligned with one another along a longitudinal axis H, and thus in a lateral direction of the slider body 100, and provide a positive lifting force at an air inlet between the slider body 100 and the disc surface (not shown). Also, a ramp portion 120 extends from a lead edge 121 of the slider body 100 to the ABS platforms 110a and 110b.

Trailing ABS 110c and 110d are provided at the rear surface portion of the slider body 100 adjacent a rear edge 123 thereof. These trailing ABS platforms 110c and 110d are symmetrically disposed on opposite sides of a central longitudinal axis of the slider body 100 and are aligned with one another in lateral direction of the slider body 100, and provide a positive lifting force at an air outlet between the slider body 100 and the disc surface (not shown). In operation, the front and rear ABS platforms 110a, 110b, 110c and 110d generate sufficient positive pressure to support the slider body 100 in a suspended state above a rotating disk of a hard disk drive.

In addition, as shown in FIGS. 4 and 5, an arcuate cross rail 130 extends across the principal surface 111 of the slider 100 and between the rear ABS platforms 110c and 110d and lead ABS platforms 110a and 110b and generally along the latitudinal axis H. The arcuate cross rail 130 and the rear ABS platforms 110c and 110d together define a substantially U-shaped projection that extends from the principle surface 111 of the slider 100. The curvature of the cross rail 130 forms a negative pressure cavity 150, that may be somewhat rounded, at the center of the slider body 100.

Additionally, a forwardmost portion 131 of the arcuate cross rail 130 may be generally aligned with the longitudinal axis L of the slider body 100 and positioned partially between the lead ABS platforms 110a, 110b. However, the cross rail 130 is positioned a distance from a rear edge 133a 133b of each of the lead ABS platforms 110a, 110b to form a pair of wide passage 135a, 135b therebetween. The wide passages 135a, 135b coact with a wide space 135c extending from the lead edge 121 and interposed between the lead ABS platforms 110a, 110b and generally aligned with the longitudinal axis L, to form a wide air flow channel 135 that terminates along the sides of the slider body 100. The configuration of the air flow channel 135 enhances the stability of the slider 100, particularly as the skew angle of air flowing past the slider body 100 increases. The configuration of the air flow channel 135 and cross rail 130 provide further advantages to be discussed more thoroughly hereinafter. It is noted that the arcuate cross rail 130 should be made as thin as possible to avoid adverse influence on the positive pressure areas created by the four separate and distinct air bearing surfaces 110a, 110b, 110c, 110d, while simultaneously providing a stable and centrally located negative pressure area 150.

The negative pressure cavity 150 functions to provide a downward pulling action on the slider body 100, which in turn creates a gram load equivalent effect that enhances stability. The rounded configuration of both the negative pressure cavity 150 and the cross rail 130 reduces the skew angle dependency on the magnitude of gram load equivalency. Since the negative pressure cavity is rounded, angular variations in the direction of air flow resulting from skew angle changes do not substantially alter the action of the negative pressure cavity 150. This results in reduced flying characteristic (flying height and roll angle) variations as the slider is positioned at different diameters along the disc surface. Skew angle related variations are further minimized by the four stable positive lifting forces positioned at each corner around the centrally located negative pressure cavity.

Another advantage of the arcuate configuration of the cross rail 130 resides in the fact that contaminates will have less of a tendency to accumulate against the front wall of the cross rail. That is, contaminates will instead tend to travel along the arcuate front wall and exit off the side of the slider body between the gaps formed by the front corner ABS projections. This also enhances read/write performance of the slider 100 over the long run.

Reference numeral 180 of FIG. 4 denotes a centrally located rail for mounting of the transducer. In particular, the transducer is mounted on the rear edge 123 of the rail 180, so as to make psuedo contact with the recording disc during flight of the slider body 100. As shown, the rear edge 123 of the rail 180 is located further to the rear of the slider body 100 than is the rear edges of the ABS platforms 100c and 100d.

Figure 6:
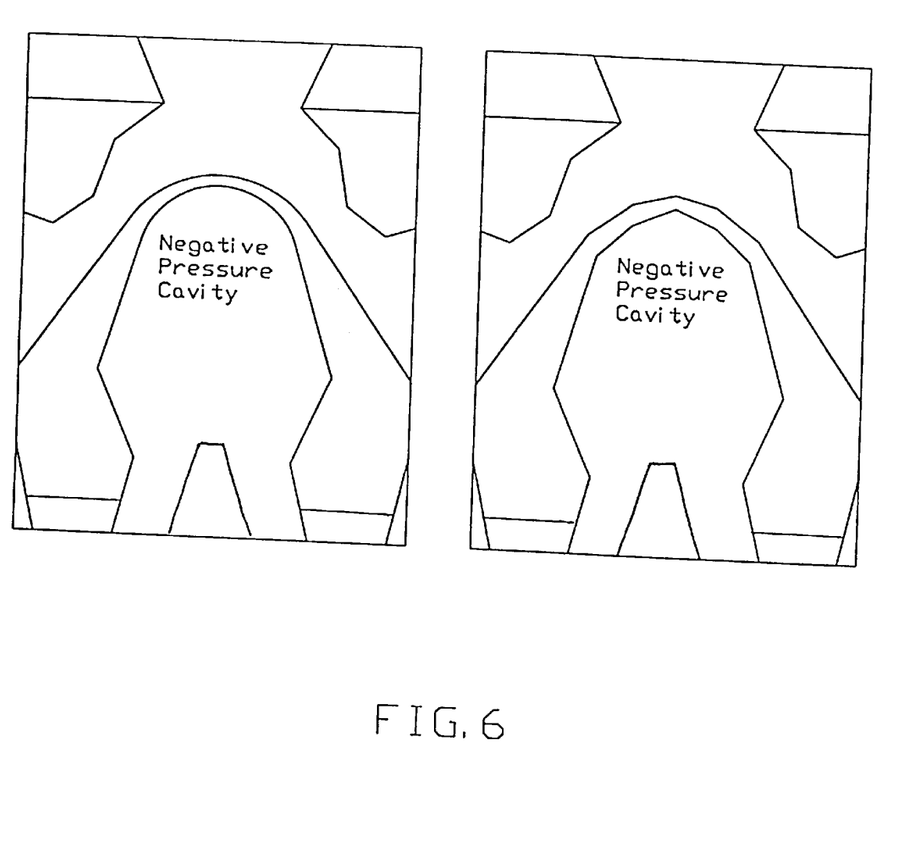
FIGS. 6(a) and 6(b) are plan views illustrating alternative cross rail configurations of the negative pressure slider for a hard disk drive according to the present invention.

As shown in FIG. 6, the cross rail 130 may be smoothly configured without inner or outer corners, or it instead may be formed by a series of connected straight sidewall segments, or a combination thereof. In any case, a substantially rounded negative pressure region is formed in proximity to the geometrical center of the slider body.

Figure 7:
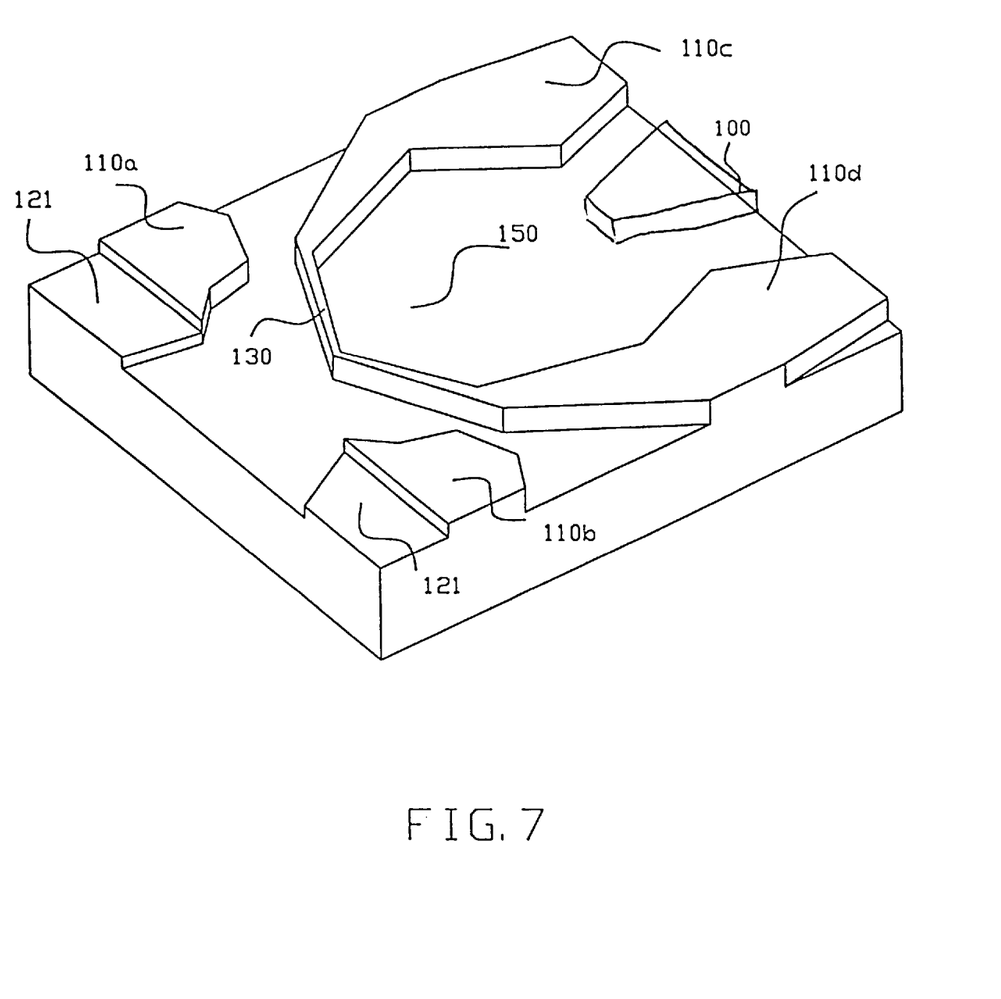
FIG. 7 is a perspective view illustrating the slider of another embodiment of the invention.

Referring again to FIG. 4, the air that supports lead ABS platforms 110a and 110b is initially compressed through action of the respective ramp regions 120 positioned at the front edge 121 of the slider body 100. The amount of air can be adjusted by changing the inclination angle of the ramp 120. Lithography techniques are used to create complex NPAB-type sliders, and a typical inclination of the etched surface obtained through lithography is around 18 degrees. Also, as shown in FIG. 7, the slider ramp regions 120 can be completely replaced by shallow recessed edge steps 121 through a lithography process.

Figure 8:
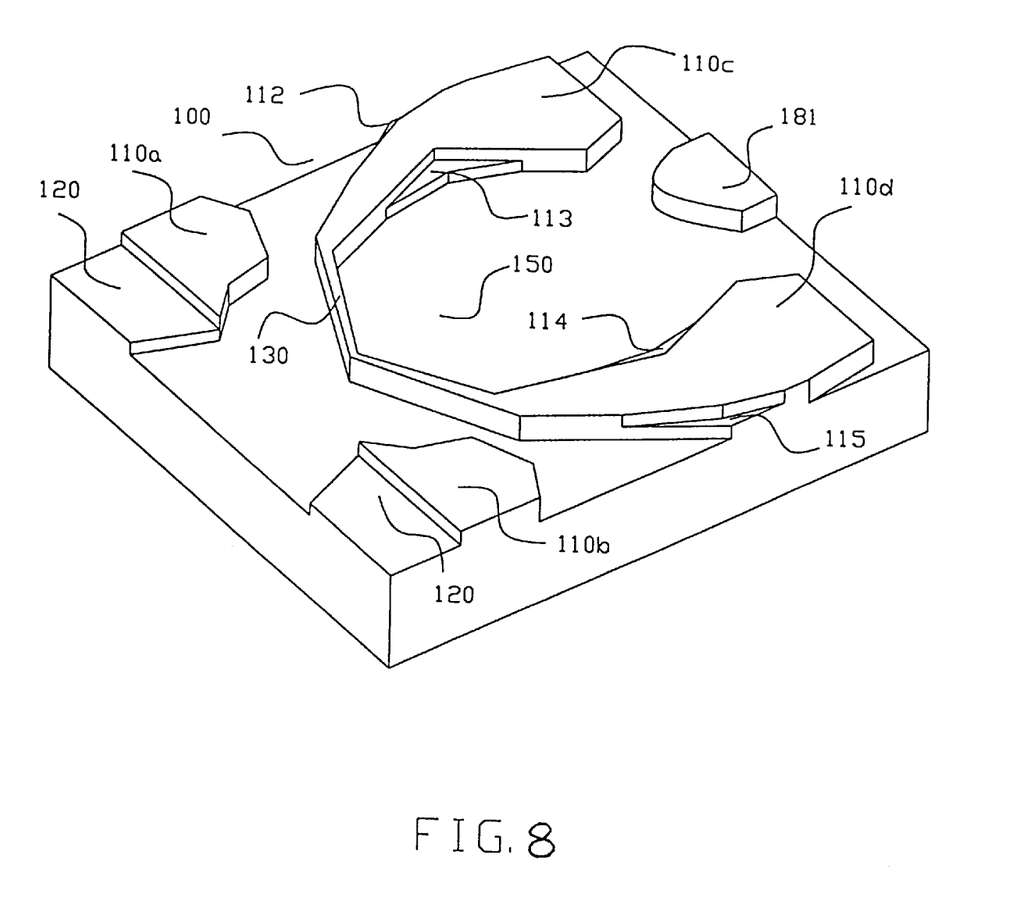
FIG. 8 is a perspective view illustrating the slider of yet another embodiment of the invention.

FIG. 8 illustrates an approach for minimizing side air flow leakage and increasing the amount of air supporting the rear ABS platform. In this embodiment, an interface region between the ABS rail 110c and the cross rail 130 includes a stepped down surface portion 112 extending between the ABS platform 110c and an edge of the slider body 100, and a stepped down surface portion 113 extending between the ABS platform 110c and said negative pressure cavity 150. Similarly, an interface region between the ABS platform 110d and the cross rail 130 includes a stepped down surface portion 115 extending between the ABS platform 110c and another edge of the slider body 100, and a stepped down surface portion 114 extending between the ABS platform 110d and said negative pressure cavity 150. Particularly under the condition of a skew angle variation, additional pressure is accumulated at the step portions 112, 113, 114 and 115, and as a result, more compressed air is applied to the rear ABS platform and the effects of skew angle variations can be reduced. It may also be useful to prepare unsymmetrical shallow edge steps so as to maximize the effects of the edge step functions.

Further modifications of the invention will now be described with reference to FIGS. 9–12.

Figure 9:
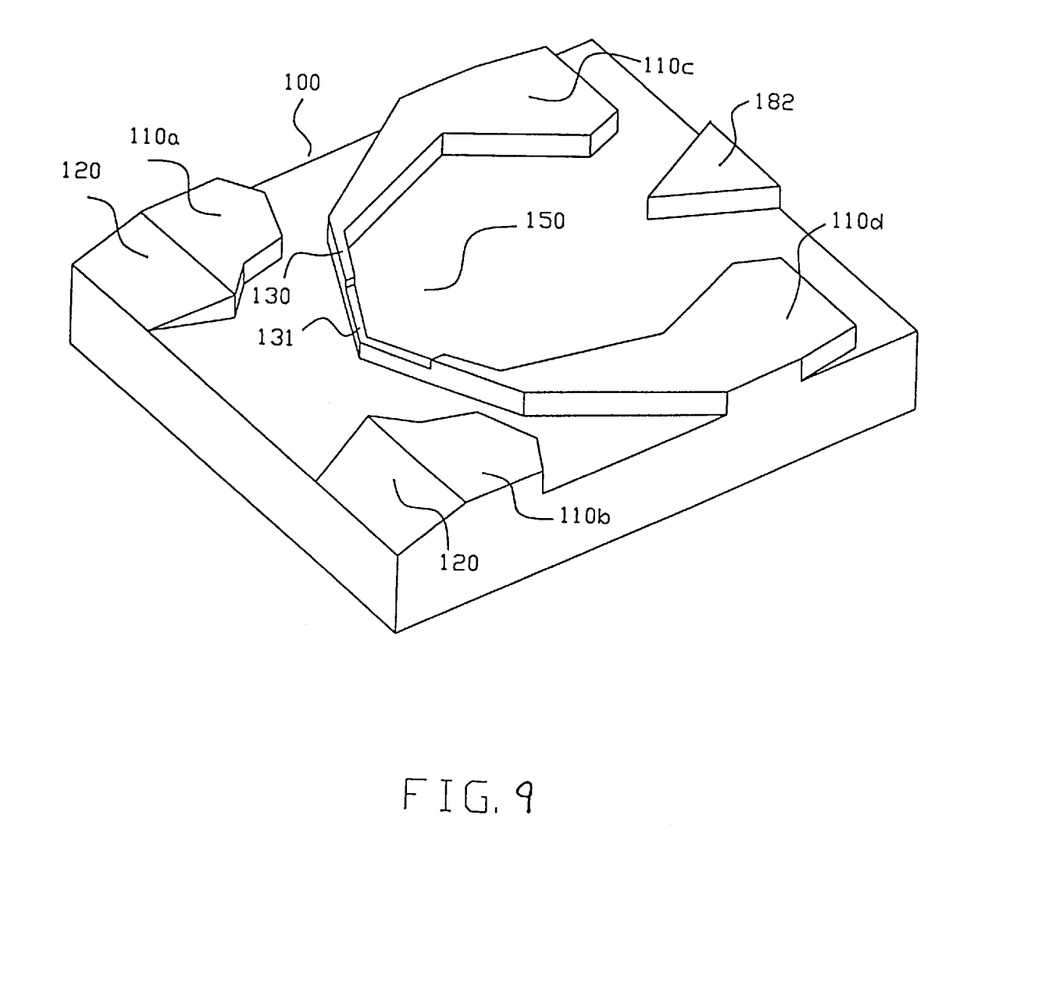
FIGS. 9–10 are perspective views of a modified embodiment of the invention for relieving negative pressure during an initial operation so as avoid retardation in take-off time.

Characteristics of the negative pressure cavity 150 may in some instances retard the take-off of the slider during an initial operational phase. This problem is largely overcome by the provision of a shallow recessed step 131 on the cross rail 130 as shown in FIG. 9. The recessed step 131 allows sufficient air flow through the negative pressure cavity 150 to prevent delay in the slider take-off period. This recessed step can also reduce debris accumulation on the cross rail 130.

Figure 10:
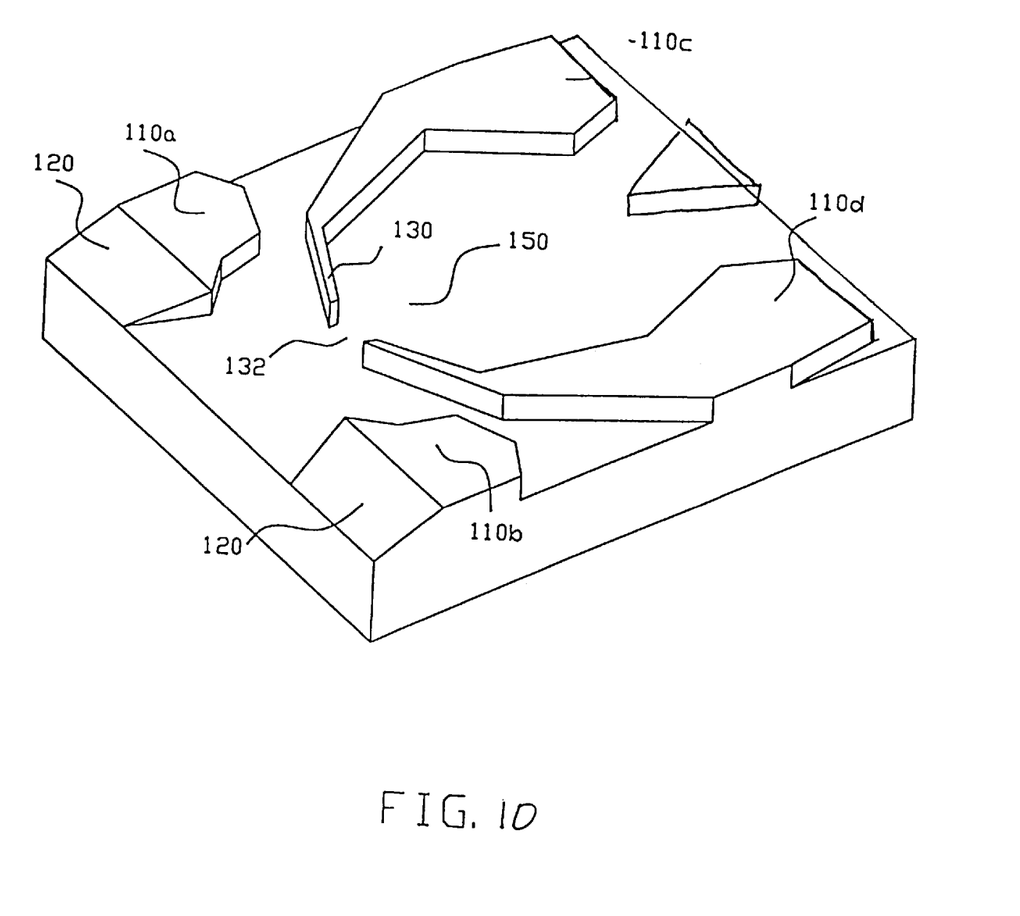

As an alternative to the recess 131, a gap 132 in the cross rail 130 may instead be provided as shown in FIG. 10. This configuration provides similar results of relieving the negative pressure during take-off and reducing debris accumulation.

Figure 11:
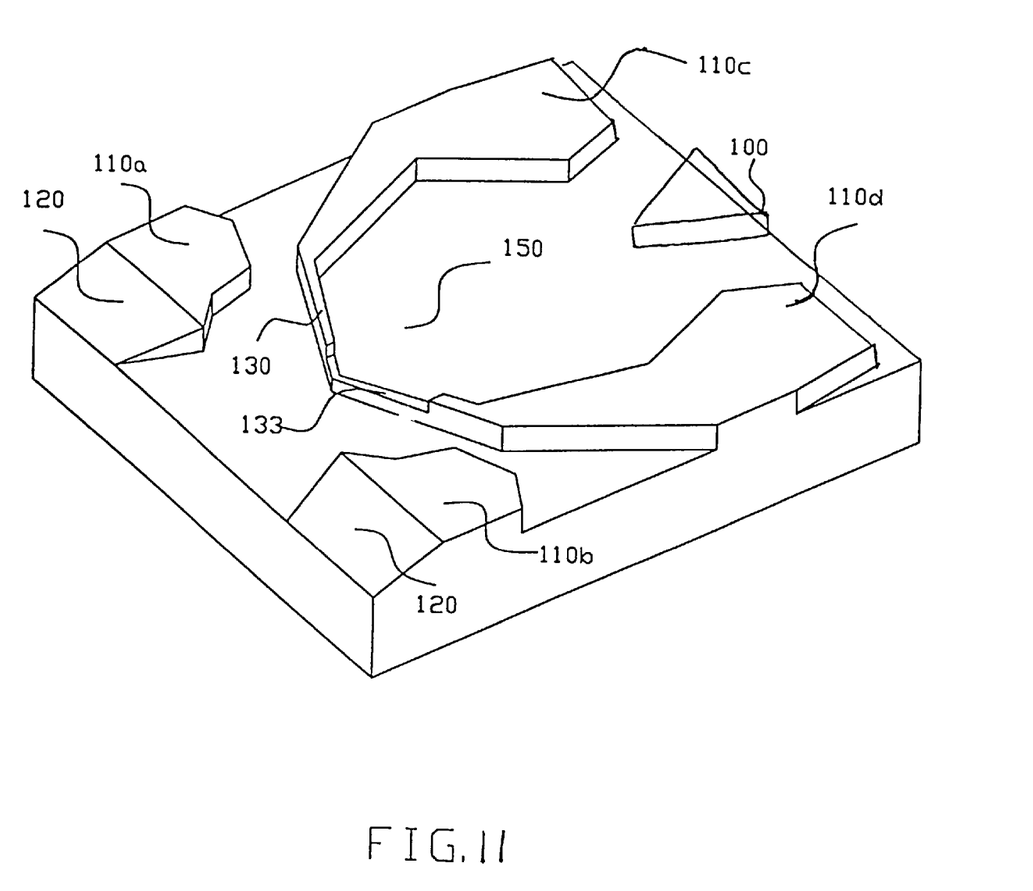
FIGS. 11–12 are perspective views of a modified embodiment of the invention for relieving negative pressure during an initial operation so as avoid retardation in take-off time, and for improving a roll angle effect by increasing air pressure on one of two major air bearing surfaces.
Figure 12:
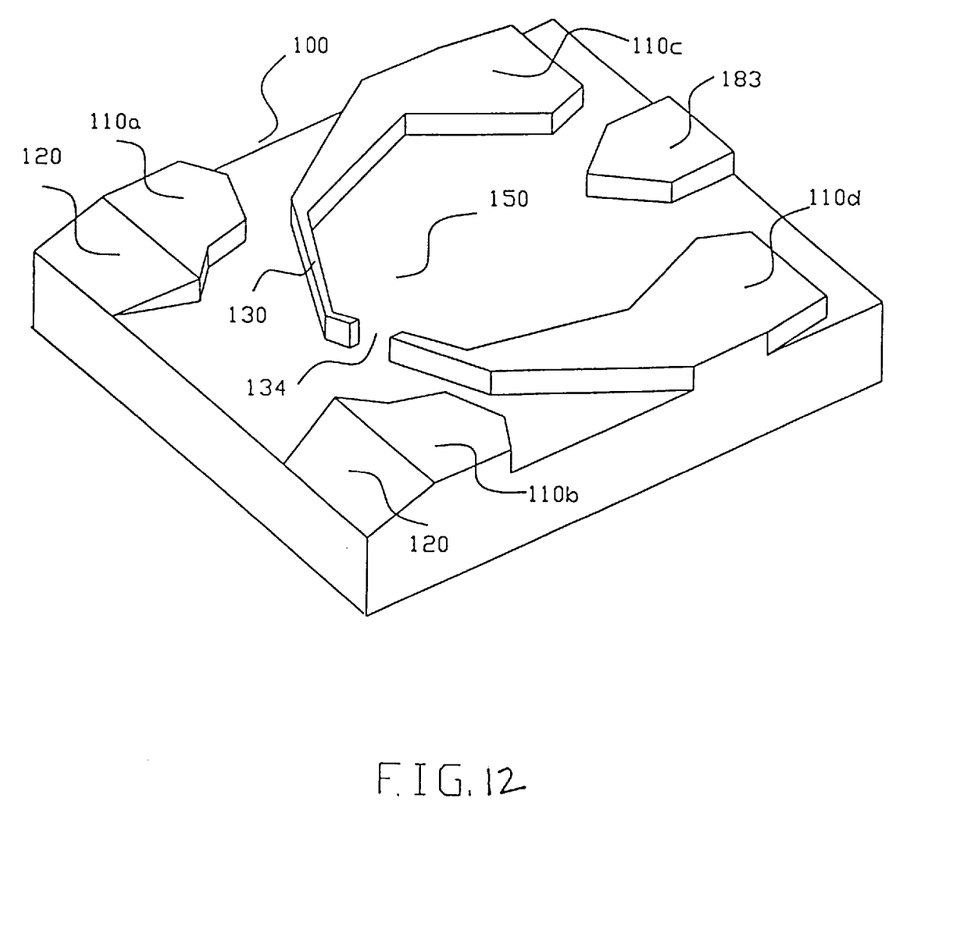

The recess 131 and the gap 132 of FIGS. 9 and 10 are symmetrically disposed on opposite sides of a central longitudinal axis of the slider body. FIGS. 11 and 12 illustrate alternative configurations in which the recess 133 and the gap 134 are offset from the longitudinal axis. In addition to the advantages of relieving negative pressure during take-off and reducing debris accumulation, these offset configurations provide a mechanism for biasing the aerodynamic characteristics to combat the problem of negative roll.

Referring once again to FIGS. 4, 8, 9 and 12, it is noted that the rear rail 180, 181, 182 and 183 can be configured any number of ways. Moreover, these rails can function as an additional ABS to enhance flying stability. The particular configuration chosen should have the dual functions of providing a hydrodynamic lifting force and minimizing debris accumulation. The sharpened or rounded leading edge of the rear rail will avoid debris accumulation, while the size of its ABS surface will dictate the degree of lifting force.

As described above, the NPAB type slider of the invention provides a relatively constant flying height, minimized roll and pitch angle variations, and excellent reliability. During operation, most of the positive pressure is generated at the four corner ABS's, and since the cross rail has a curved configuration, negative pressure is generated at a geometrical central area. This results in stable flying characteristics without substantial variations in the flying height and pitch and roll angles throughout the entire data range. Additionally, the arcuate configuration of the cross rail minimizes contaminant accumulation.

While the present invention has been described in terms of the embodiments described above, those skilled in the art will recognize that the invention can be practiced with modification within the spirit and scope of the appended claims and their equivalents.

What is claimed is:

1. A negative pressure air bearing slider, comprising:
    a slider body for flying above a surface of a recording disc during relative rotation of the disc, the slider body having a principal surface for confronting the surface of the disc, said principal surface having a lead portion, a rear portion, a first side portion and a second side portion, wherein the lead portion is spaced upstream of the rear portion relative to a longitudinal direction of said slider body which is coincident with a tangential rotational direction of the recording disc, and wherein the first side portion is spaced from the second side portion relative to a lateral direction of said slider body;
    first and second projections extending from said lead portion of said principal surface of said slider body to define first and second air bearing surfaces, said first and second air bearing surfaces spaced apart from each other in the lateral direction of said slider body;
    a U-shaped projection extending from said principal surface of said slider body, said U-shaped projection including an arcuate front wall portion at least partially located between said first and second air bearing surfaces, said U-shaped projection further including first and second side wall portions extending from opposite ends of said arcuate front wall rearwardly toward said rear portion and outwardly toward said first and second side portions of said principal surface for defining a negative pressure cavity therein, said first and second wall portions terminating at said rear portion of said principle surface of said slider body for defining third and fourth air bearing surfaces, said third and fourth air bearing surfaces spaced apart from each other along said lateral direction of said slider body and spaced apart from said first and second air bearing surfaces along said longitudinal direction of said slider body; a fourth projection extending from said rear portion of said principal surface of said slider body, said fourth projection interposed between said third and fourth air bearing surfaces and generally aligned with said longitudinal direction of said slider body; and
    a transducer mounted on a rear edge of said fourth projection for establishing pseudo contact with the disc surface while said slider body is flying above said disc surface.

2. The negative pressure air bearing slider as claimed in claim 1, wherein said U-shaped projection is axisymmetrical about a longitudinal axis of said slider body.

3. The negative pressure air bearing slider as claimed in claim 2, wherein said first and said second air bearing surfaces are symmetric about said longitudinal axis of said slider body.

4. The negative pressure air bearing slider as claimed in claim 2, wherein said first and said second air bearing surfaces are respectively longitudinally aligned with said third and fourth air bearing surfaces, and wherein said negative pressure cavity is centrally located between said air bearing surfaces.

5. The negative pressure air bearing slider as claimed in claim 1, wherein each of said first and said second air bearing surfaces include a tapered surface portion, the tapered surface portion tapering from each air bearing surface toward a lead edge of said slider body.

6. The negative pressure air bearing slider as claimed in claim 1, wherein each of said first and said second air bearing surfaces include a stepped down surface portion, the stepped down surface portion extending from each air bearing surface to a lead edge of said slider body.

7. The negative pressure air bearing slider as claimed in claim 1, wherein an interface region between said arcuate front wall portion and said first side wall portion includes a first stepped down surface portion extending between said third air bearing surface and an inner edge of said slider body, and wherein an interface region between said arcuate front wall portion and said second side wall portion includes a second stepped down surface portion extending between said fourth air bearing surface and an outer edge of said slider body.

8. The negative pressure air bearing slider as claimed in claim 1, wherein an interface region between said arcuate front wall portion and said first side wall portion includes a first stepped down surface portion extending between said third air bearing surface and said negative pressure cavity, and wherein an interface region between said arcuate front wall portion and said second side wall portion includes a second stepped down surface portion extending between said fourth air bearing surface and said negative pressure cavity.

9. The negative pressure air bearing slider as claimed in claim 8, wherein the interface region between said arcuate front wall portion and said first side wall portion further includes a third stepped down surface portion extending between said third air bearing surface and said negative pressure cavity, and wherein the interface region between said arcuate front wall portion and said second side wall portion further includes a fourth stepped down surface portion extending between said fourth air bearing surface and said negative pressure cavity.

10. The negative pressure air bearing slider as claimed in claim 1, wherein an elongated groove is provided in said arcuate front wall portion, said groove extending between said first and second side wall portions.

11. The negative pressure air bearing slider as claimed in claim 1, wherein an opening is provided in said arcuate front wall portion, said opening located between said first and second side wall portions and extending to said principle surface of said slider body.

12. The negative pressure air bearing slider as claimed in claim 11, wherein said opening is offset from a longitudinal axis of said slider body.

13. The negative pressure air bearing slider as claimed in claim 11, wherein said opening is symmetrical about a longitudinal axis of said slider body.

14. The negative pressure air bearing slider as claimed in claim 10, wherein said elongated groove in said arcuate front wall portion is symmetrical about a longitudinal axis of said slider body.

15. The negative pressure air bearing slider as claimed in claim 10, wherein said elongated groove in said arcuate front wall portion is offset about a longitudinal axis of said slider body.

16. A negative pressure air bearing slider, comprising:

a slider body for flying above a surface of a recording disc during relative rotation of the disc, the slider body having a principal surface facing the surface of the disc, said slider having a lead edge, a rear edge, a first side edge and a second side edge, wherein the lead edge is spaced upstream of the rear edge along a longitudinal axis of said slider body, the longitudinal axis coincident with a tangential rotational direction of the recording disc, and wherein the first side edge is spaced from the second side edge along a latitudinal axis of said slider body;

first and second projections extending from a lead portion of said principal surface adjacent to said lead edge to provide first and second air bearing surfaces, said first and second air bearing surfaces spaced apart from each other along said latitudinal axis and located proximal to said first and second side edges of said slider body such that a gap is provided therebetween;

a U-shaped projection extending from said principal surface of said slider body, said U-shaped projection including an arcuate front wall and first and second side walls extending from each end of said front wall, each of said side walls extending rearwardly toward said rear portion and outwardly toward an adjacent side edge of said slider body for defining a negative pressure cavity therein, a forwardmost portion of said arcuate front wall located at least partially between said first and second air bearing surfaces such that first and second passages are formed between the arcuate front wall and a rear edge of said first and second air bearing surfaces, said passages communicating with said gap to provide a flow path that extends from said lead portion and terminates along said side edges prior to reaching a rear portion of said slider body adjacent to said rear edge thereof, said first and second wall portions terminating at said rear portion of said slider body for defining third and fourth air bearing surfaces spaced apart along said latitudinal axis and located proximal to said first and second side edges of said slider body, the air bearing surfaces positioned about on said principle surface of said slider body such that four separate and distinct positive pressure areas are provided when said slider body is flying above said rotating disc; and a fourth projection extending from said rear portion of said slider body, said fourth projection generally aligned with said longitudinal axis of said slider body, the fourth projection including a transducer mounted on a rear edge thereof for establishing pseudo contact with the disc surface while said slider body is flying above said disc.

17. The negative pressure air bearing slider of claim 16 wherein said forward most portion of said arcuate front wall is aligned generally with said longitudinal axis of said slider body.

18. The negative pressure air bearing slider of claim 16 wherein said negative pressure cavity is generally rounded.

19. The negative pressure air bearing slider of claim 16 wherein each of the passages of said flow path extend tangentially to said longitudinal axis of said slider body.

20. The negative pressure air bearing slider of claim 16 wherein each of the passages and said gap of said flow path coact to provide a wide flow path.

* * * * *